United States Patent
Chang et al.

(10) Patent No.: US 9,055,237 B1
(45) Date of Patent: Jun. 9, 2015

(54) PROJECTION AUTOFOCUS

(75) Inventors: Samuel Henry Chang, San Jose, CA (US); Weijian Wang, Cupertino, CA (US)

(73) Assignee: Rawles LLC, Wilmington, DE (US)

( * ) Notice: Subject to any disclaimer, the term of this patent is extended or adjusted under 35 U.S.C. 154(b) by 218 days.

(21) Appl. No.: 13/486,710

(22) Filed: Jun. 1, 2012

(51) Int. Cl.
  *H04N 9/31* (2006.01)
  *G03B 3/10* (2006.01)
  *G03B 21/14* (2006.01)
  *G03B 15/14* (2006.01)

(52) U.S. Cl.
  CPC . *H04N 9/31* (2013.01); *G03B 15/14* (2013.01)

(58) Field of Classification Search
  USPC ............ 353/69, 100, 101, 121, 122; 382/162, 382/167, 168, 274
  See application file for complete search history.

(56) References Cited

U.S. PATENT DOCUMENTS

| | | | |
|---|---|---|---|
| 7,095,904 B2 | 8/2006 | Wang | |
| 7,370,980 B2 * | 5/2008 | Hirao et al. | 353/101 |
| 7,418,392 B1 | 8/2008 | Mozer et al. | |
| 7,559,658 B2 * | 7/2009 | Kamiya et al. | 353/101 |
| 7,720,683 B1 | 5/2010 | Vermeulen et al. | |
| 7,774,204 B2 | 8/2010 | Mozer et al. | |
| 7,972,018 B2 * | 7/2011 | Sajadi et al. | 353/101 |
| 8,419,190 B2 * | 4/2013 | Huang et al. | 353/76 |
| 8,491,127 B2 * | 7/2013 | Wang | 353/69 |
| 2005/0286026 A1 * | 12/2005 | Matsumoto et al. | 353/101 |
| 2010/0026972 A1 * | 2/2010 | Kaneko | 353/101 |
| 2012/0218523 A1 * | 8/2012 | Mizuno et al. | 353/69 |
| 2012/0223885 A1 | 9/2012 | Perez | |
| 2013/0235092 A1 * | 9/2013 | Nakashin | 345/690 |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — William C Dowling
(74) *Attorney, Agent, or Firm* — Lee & Hayes, PLLC

(57) ABSTRACT

Techniques are described for projecting content onto surfaces and for focusing the content. When content is projected by a projector onto a surface, the surface is observed by a camera or other sensor, and the contrast of the projected content is evaluated. The projector then varies its focal point to improve or maximize the observed contrast of the projected content.

17 Claims, 3 Drawing Sheets

PROJECTION AUTOFOCUS

BACKGROUND

A large and growing population of people is enjoying entertainment through consumption of digital content items, such as music, movies, images, books and so on. Many people today consume digital content through a wide variety of electronic devices. Among these electronic devices are cellular telephones, personal digital assistants (PDAs), electronic book readers, portable media players, tablets, netbooks and the like.

As more content is made available in digital form, people continue to consume more and more of this content. In addition, this population expects digital content to become more and more accessible and ubiquitous.

Although content has become easier to obtain, a number of issues remain. For example, people may have difficulty determining and locating the appropriate device to use for a particular action. In addition, once the device is identified, the device still needs to be operable and properly configured to perform the desired task.

These issues may be addressed in certain situations by projecting content onto available surfaces, such as walls, tables, or handheld objects. In automated systems, the particular surface upon which content is to be projected may be determined dynamically, in response to user actions or other environmental conditions. In some cases, it may be desired to project content onto a moving object, such as a sheet of paper held by a user.

In situations where a projector is positioned for projection onto a single, stationary target, a user can manually focus the projector to produce a sharp and focused image. This may not be practical, however, in situations where the projector is part of an automated and adaptive system used for projecting content onto various dynamically specified surfaces, including moving surfaces.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes systems and techniques for automatically and/or programmatically focusing a projector on a display surface that is at an unknown and/or variable distance from the projector. In certain embodiments, content is projected onto a display surface. A camera is used to observe the projected content. Captured images of the observed content are analyzed to determine contrast of the projected content, which is used as an indicator of focus quality. The focal point of the projector is then varied until the highest possible contrast is observed in the captured images.

Example Environment

Figure 1:
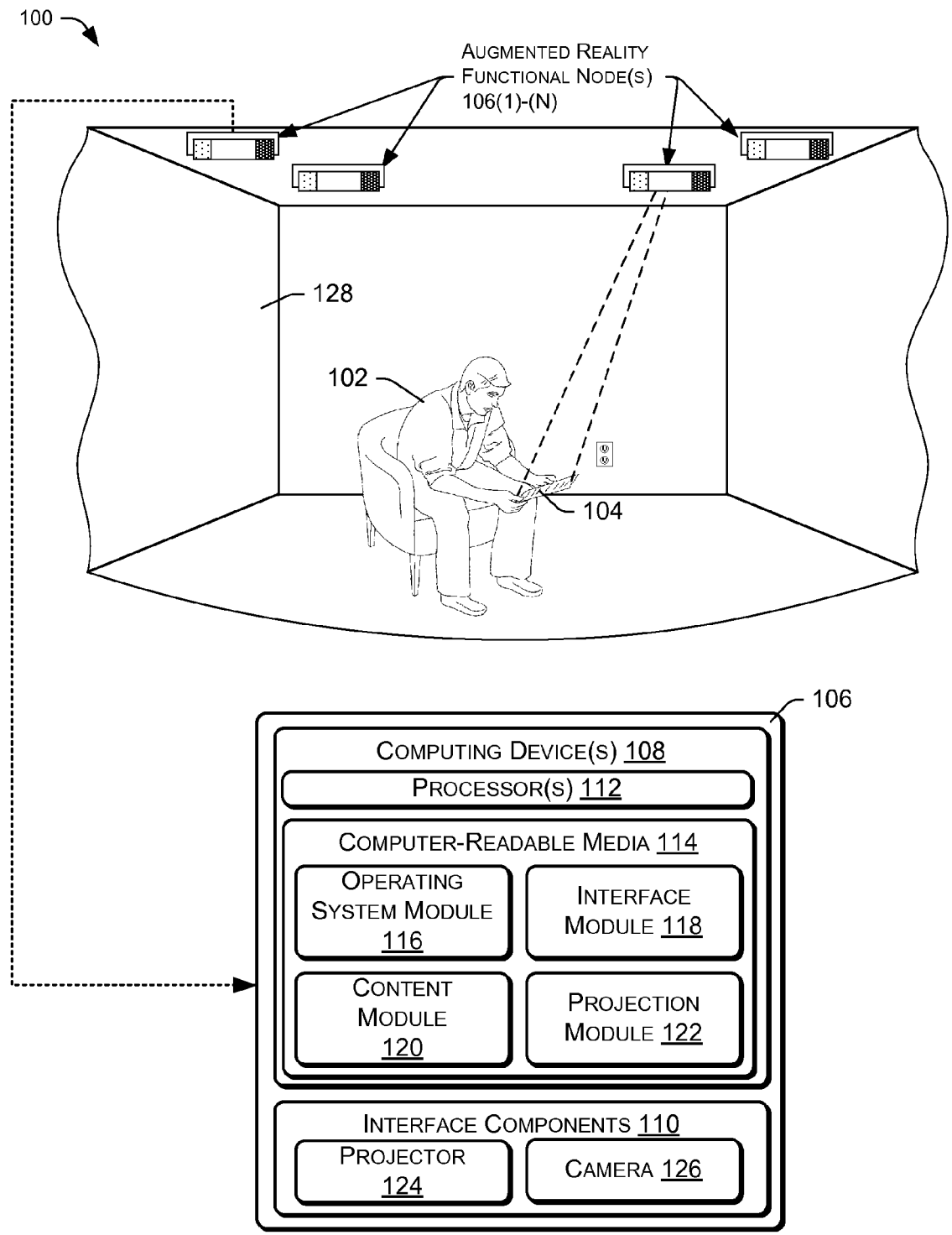
FIG. 1 illustrates an environment that includes an augmented reality functional node (ARFN) that projects content onto various surfaces of the environment.

FIG. 1 illustrates an example environment 100 in which a user 102 consumes content that is projected onto a display medium 104 by one or more augmented reality functional nodes (ARFNs) 106(1), . . . , 106(N) (collectively referred to as "the ARFN 106" in some instances). It is to be appreciated that the techniques described herein may be performed by a single ARFN 106, by a collection of any number of ARFNs 106, or by any other devices or combinations of devices.

The projected content may include any sort of multimedia content, such as text, color images or videos or any other visual content. In some cases, the projected content may include interactive content such as menus and controls.

Each ARFN 106 may include one or more computing devices 108, as well as one or more interface components 110. The computing devices 108 and interface components 110 may be configured in conjunction with each other to interact with the user 102 within the environment 100. In particular, the ARFN 106 may be configured to project content onto the display medium 104 for viewing by the user 102, or onto other display surfaces within the environment such as walls, tabletops, and so forth.

The computing device 108 of the example ARFN 106 may include one or more processors 112 and computer-readable media 114. The processor(s) 112 may be configured to execute instructions, which may be stored in the computer-readable media 114 or in other computer-readable media accessible to the processor(s) 112. The processor(s) 112 may include digital signal processors (DSPs), which may be used to process audio signals and/or video signals.

The computer-readable media 114, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the computing device 108. The computer-readable media 114 may reside within a housing of the ARFN 106, on one or more storage devices accessible on a local network, on cloud storage accessible via a wide area network, or in any other accessible location.

The computer-readable media 114 may store various modules, such as instructions, datastores, and so forth that are configured to execute on the processor(s) 112. For instance, the computer-readable media 114 may store an operating system module 116 and an interface module 118.

The operating system module 116 may be configured to manage hardware and services within and coupled to the computing device 108 for the benefit of other modules. The interface module 118 may be configured to receive and interpret commands received from users within the environment 100, and to respond to such commands in various ways as determined by the particular environment.

The computer-readable media 114 may also include a content or content generation module 120 that is executable to generate and/or provide content for projection onto the display medium 104. Content may comprise static images such as photographs or dynamic images such as video.

The computer-readable media 114 may also include a content projection module 122 that is executable to project content onto the display medium 104 and to perform certain processing as described below. In particular, the projection module 122 may implement the techniques described below for automatically focusing projected content.

The computer-readable media 114 may contain other modules, which may be configured to implement various different functionality of the ARFN 106.

The ARFN 106 may include various interface components 110, such as user interface components and other components that may be used to detect and evaluate conditions and events within the environment 100. As examples, the interface components 110 may include one or more projectors 124 and one or more cameras 126. The interface components 110 may in certain implementations include various other types of sensors and transducers, content generation devices, and so forth, including microphones, speakers, range sensors, and other devices.

The projector 124 may be used to project content onto the display medium 104 or other available surfaces for viewing by the user 102. The projector 124 may comprise a microlaser projector, a digital light projector (DLP), cathode ray tube (CRT) projector, liquid crystal display (LCD) projector, light emitting diode (LED) projector or the like. The projector 124 may have rotate, pan, and zoom capabilities, provided either electronically or by physical actuators. The projector 124 may also have a variable focal point, which may be implemented by a variable focus lens and an electro-mechanical actuator or other means.

In the described embodiment, the ARFN 106 controls the projector 124 to project content onto an appropriate surface within the environment 100. For example, the ARFN 106 may project content onto the handheld display medium 104 as the display medium is held and moved by the user 102. As another example, the ARFN 106 may project content onto a wall 128 of the environment 100. The ARFN 106 may respond to commands or instructions received from the user 102 to display the content on different surfaces at different times. For example, certain physical gestures made by the user may be interpreted as commands or instructions. Projection control may also be implemented through the use of voice commands, through monitoring the position and/or orientation of the user, through keyboard or other physical input, and so forth.

The camera 126 may be used for various purposes, such as determining the location of the user 102, detecting user gestures, determining the poses of the display medium 104 and objects within the environment 100, reconstructing 3D characteristics of objects within the environment 100, and so forth. The camera 126 may in some embodiments have rotate, pan, and zoom capabilities, provided either electronically or by physical actuators. The camera may have a variable focus or fixed focus lens.

In the described embodiment, the camera 126 is configured to capture and provide sequential images of the environment 100 or of a portion of the environment 100. The images may be raster images comprising arrays of pixels, where each pixel has one or more intensities corresponding to one or more colors or color-related parameters. The camera 126 may produce color or monochrome images, and in some cases may be capable of capturing non-visible light such as infrared (IR).

The coupling between the computing device 108 and the interface components 110 may be via wire, fiber optic cable, wireless connection, or the like. Furthermore, while FIG. 1 illustrates the computing device 108 as residing within a housing of the ARFN 106, some or all of the components of the computing device 108 may reside at another location that is operatively connected to the ARFN 106. In still other instances, certain components, logic, and/or the like of the computing device 108 may reside within a projector or camera. Therefore, it is to be appreciated that the illustration of the ARFN 106 of FIG. 1 is for illustrative purposes only, and that components of the ARFN 106 may be configured in any other combination and at any other location.

Furthermore, additional resources external to the ARFN 106 may be accessed, such as resources in another ARFN 106 accessible via a local area network, cloud resources accessible via a wide area network connection, or a combination thereof. In still other instances, the ARFN 106 may couple to and control other devices within the environment, such as televisions, stereo systems, lights, and the like.

In other implementations, the components of the ARFN 106 may be distributed in one or more locations within the environment 100. For example, the camera and projector may be distributed throughout the environment and/or in separate chasses.

Automatic Projection Focusing

Figure 2:
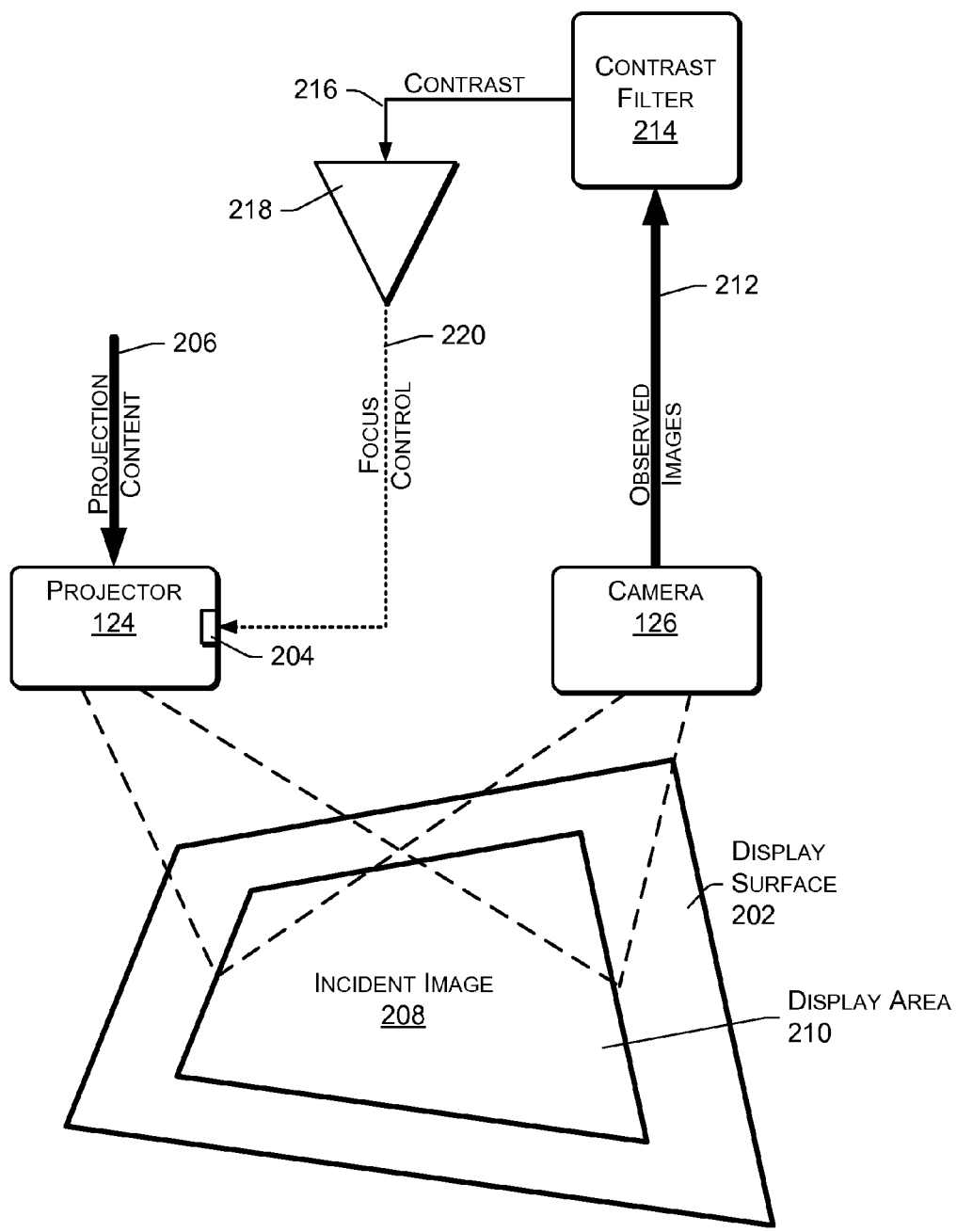
FIG. 2 is block diagram illustrating a technique for focusing projected content on a display surface.

FIG. 2 illustrates conceptually how the system of FIG. 1 may be configured to project content onto an arbitrary display surface 202 and to automatically focus the content. The display surface 202 may be any available planar or non-planar surface, including a wall, a tabletop, an object, and so forth. The ARFN 106 may be configured to project the content onto different surfaces in response to user commands and detected environmental conditions. Furthermore, any given surface upon which content is projected may be moveable. Accordingly, the techniques described below allow content to be projected onto moving targets and targets whose distances from the projector are unknown and/or changing.

The content may be projected from the projector 124, which may have rotate, pan, and zoom capabilities so that the content can be directed toward various different locations within an environment. The projector 124 may also have a focus control input 204, which may be used to control the focal point of the projector 124. More specifically, the projector 124 may have a lens or optical path (not shown) whose focal point is varied in response to the focus control input 204.

Projection content 206 may be generated by the content module 120, and may include still images, moving images, user interface elements, and so forth. Projected images may include both visible and non-visible images. Visible images may be used to convey perceptible information to a user, such as photographs, videos, documents, diagrams, illustrations, user interfaces, and so forth, which may or may not include interactive elements. Non-visible images, such as IR images or patterns, may in some cases be used by the ARFN 106 for environment analysis. For example, non-visible light patterns may be projected and analyzed to model three-dimensional characteristics of an environment and objects within the environment.

The content 206 is projected by the projector 124 to create an incident image 208 on a display area 210 of the display surface 202. Initially, the projector may use any available focal point, such as an intermediate focal point, and the resulting incident image 208 may be relatively focused or unfocused.

The camera 126 is used to observe the incident image 208, and to capture a sequence of observed images 212 of the incident image 208. The camera 126 may have rotate, pan, and zoom capabilities in order to observe the particular display area 210 containing the incident image 208. In some embodiments, the ARFN 106 may control the projector 124 and the camera 126 so that their image fields coincide. In other embodiments, the camera 126 may encompass a relatively wide field of view, and captured images may be trimmed or cropped so that they correspond to the area of the incident image 208. Multiple cameras may be used in some embodiments to observe different areas of an environment.

The projection module 122 may implement a contrast filter or function 214 that is responsive to the observed images 212 captured by the camera 126 to determine contrast 216 of the observed images. Optical contrast is a measure of the difference in color, brightness, and/or luminance of image pixels. In-focus images tend to exhibit relatively high contrast. Out-of-focus images tend to exhibit relatively lower contrast. Improving or maximizing the contrast of an image therefore tends to improve or maximize its sharpness or focus quality.

A controller or control element 218 receives the contrast 216 from the contrast filter 214. The controller 218 produces a focus control signal 220 that is provided to the focus control input 204 of the projector 124. The controller 218 is configured to adjust the focal point of the projector 124 to achieve the highest possible contrast at any given time.

The technique illustrated by FIG. 2 may be repeated continuously or periodically, so that the correct or optimal focus may be achieved even when the display surface 202 is moving. In situations where the display surface 202 is not moving, the technique of FIG. 2 may be repeated until the contrast and focus quality have been maximized, and may be initiated anew when the content is projected onto a new or different display area.

The contrast filter 214 and controller 218 represent functionality that may be implemented by the projection module 122 of the ARFN 106. Generally, the projection module 122 receives a sequence of captured images from the camera 126, and processes each of the received images to determine contrast of the incident image over time. Concurrently, the projection module 122 varies or scans the focal point of the projector 124 and determines the focal point at which the highest contrast is observed. This process may be repeated indefinitely, periodically, or until the focus has been optimized for a particular display area.

As an example of the scanning, the projection module 122 may make an initial contrast evaluation, incrementally change the focal point in a first direction, make another incremental contrast evaluation, and determine whether or not the contrast has increased as a results of the change. If the contrast has improved, the projection module 122 may continue to incrementally change the focus in the first direction until the contrast begins to decrease or until the contrast stops increasing. If the contrast is not improved by the initial change, the projection module 122 may incrementally change the focal point in the other direction until the contrast begins to decrease or stops increasing. If at any point during the changing in the first direction the observed contrast begins to decrease or stops increasing, the projection module 122 may reverse the direction of incremental focal point changes, and may begin incrementally changing the focal point in a second or opposite direction until the changing no longer increases the contrast. Eventually, this process will converge upon or around an optimum focal point.

Contrast can be evaluated by analyzing distributions of relative pixel intensities within an image. Such distributions are often represented as and referred to as image histograms or pixel intensity histograms. Contrast may be quantified in various ways, using different known formulas. For example, contrast in some embodiments may account for separate color channels of the captured images. In other embodiments, the captured images may be analyzed in terms of overall pixel luminance, without regard to individual color channels. More specifically, contrast may be calculated as a luminance contrast, which is the ratio of the range of pixel luminances within an image to the average of the pixel luminances within the image. Other documented contrast measurements include the Weber contrast, the Michelson contrast, and the root mean square (RMS) contrast.

Figure 3:
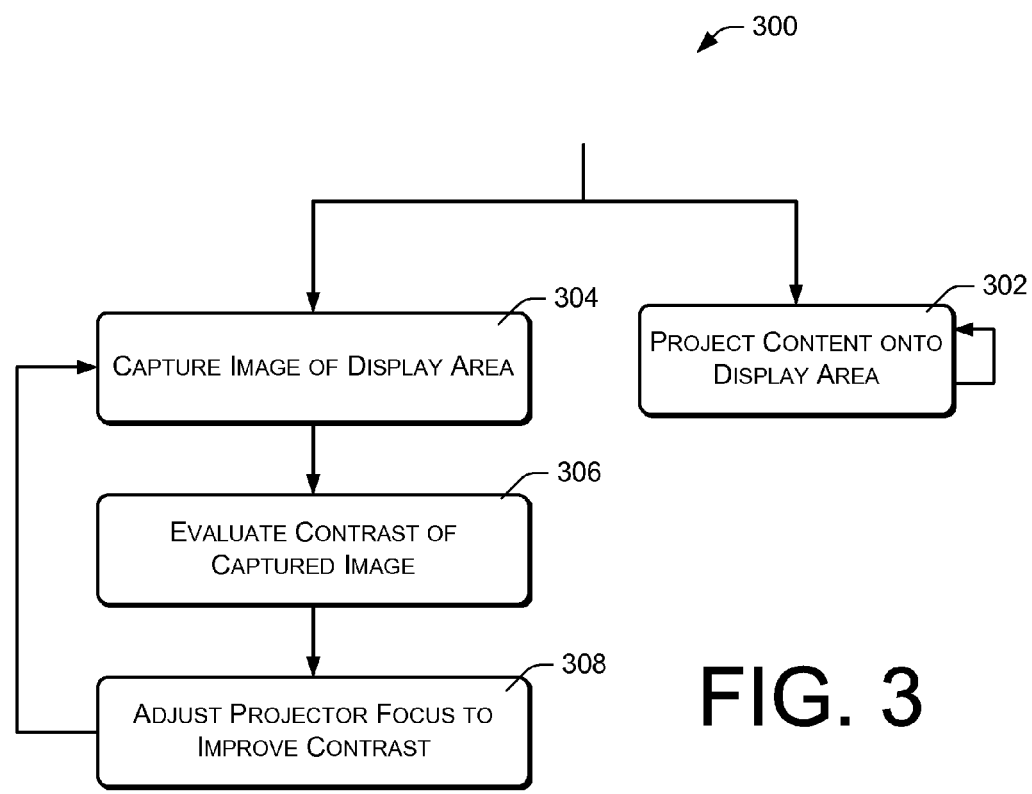
FIG. 3 is an example flow diagram of an ARFN projecting and focusing content on a display surface.

FIG. 3 illustrates an example method 300 of projecting and focusing content onto a display area. An action 302 comprises projecting the content onto the display area. As described above, the display area may be any available surface within an environment, and may change from time to time. In addition, a particular display medium may move or be in motion. The ARFN 106 of FIG. 1 may be configured to direct the projected content toward the coordinates of whatever display medium has been designated as a target. The action 302 is performed repetitively and continuously, to project sequential images frames onto the display area.

Concurrently with the projection action 302, a series of actions depicted on the left side of FIG. 3 are performed iteratively. An action 304 comprises observing the display area, such as by capturing and/or obtaining an image of the display area and the incident image that has been projected onto the display area.

An action 306 comprises evaluating the contrast of the captured image, which may be performed by analyzing distributions of pixel intensities or luminances.

An action 308, performed based at least in part on the evaluated contrast, comprises adjusting the projector focus to improve or increase contrast.

Iterations of the focus cycle shown as actions 304, 306, and 308 are repeated as part of a scan or search, in which each focus adjustment is based on observed impacts of previous adjustments. By performing the focus cycle repetitively, the system may converge on an optimum focus adjustment. In some cases, such as when projecting content onto a fixed surface, the focus cycle may be terminated after converging on an optimum focus. In other cases, the focus cycle may be allowed to repeat itself indefinitely, to account for a moving display surface or other changing conditions.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   a camera;
   a projector having an adjustable focus;
   one or more computer-readable media storing computer-executable instructions that, when executed by the one or more processors, cause the one or more processors to perform acts comprising:
   projecting content onto a display area with the projector, the content including moving images;
   capturing one or more different images of at least a portion of the display area with the camera;
   evaluating contrast of the captured one or more different images; and
   adjusting the focus of the projector based at least in part on the evaluating to increase contrast of the projected content relative to the evaluated contrast of the captured one or more different images.

2. The system of claim 1, wherein adjusting the focus comprises:
changing the focus of the projector in a first direction;
determining that the subsequent evaluated contrast of a particular captured image decreases relative to the evaluated contrast of a previously captured image of the one or more images; and
changing the focus of the projector in a second direction.

3. The system of claim 1, wherein evaluating the contrast of a particular one of the captured one or more different images comprises analyzing a relative pixel intensity distribution of a pixel intensity histogram of the particular one of the captured one or more different images.

4. A method comprising:
projecting content onto a display area, the projected content including moving images;
capturing one or more images of the projected content;
evaluating contrast of the one or more captured images by analyzing a relative pixel intensity distribution of a pixel intensity histogram of at least one of the one or more captured images; and
focusing the projected content in response to the evaluated contrast of the one or more captured images.

5. The method of claim 4, wherein the focusing comprises changing the focus of the projected content in a direction that increases the evaluated contrast of a particular one of the captured images relative to the evaluated contrast of a previously captured one of the captured images.

6. The method of claim 4, wherein the focusing comprises:
changing the focus of the projected content in a first direction; and
determining that the changing does not increase the evaluated contrast of a particular one of the captured images relative to the evaluated contrast of a previously captured one of the captured images.

7. The method of claim 4, wherein the focusing comprises:
changing the focus of the projected content in a first direction; determining that the evaluated contrast of a particular one of the captured images decreases relative to a previously captured one of the captured images; and
changing the focus in a second direction.

8. The method of claim 4, wherein the projected content comprises visible content.

9. One or more computer-readable media storing computer-executable instructions that, when executed by one or more processors, cause the one or more processors to perform acts comprising:
tracking movement of a moving display area that moves within an environment;
causing content to be projected onto the moving display area;
evaluating, at two or more points in time, focus quality of the projected content on the moving display area based at least in part on a measured contrast of the projected content; and
transmitting, at various times, a signal to adjust a focus of the projected content in response to the evaluated focus quality.

10. The one or more computer-readable media of claim 9, wherein evaluating the focus quality comprises measuring optical contrast of at least a portion, but not all, of the projected content.

11. The one or more computer-readable media of claim 9, wherein the evaluating is based at least in part on one or more captured images of the projected content.

12. The one or more computer-readable media of claim 9, wherein the evaluating comprises:
capturing an image of the projected content; and
measuring optical contrast of the captured image.

13. The one or more computer-readable media of claim 9, wherein the evaluating is based at least in part on observed relative pixel intensities of corresponding pixel intensity histograms of the projected content.

14. The one or more computer-readable media of claim 9, wherein the evaluating comprises capturing an image of the projected content, wherein the evaluating is based at least in part on observed relative pixel intensities of corresponding pixel intensity histograms of the captured image.

15. The one or more computer-readable media of claim 9, wherein the content comprises moving images.

16. The system of claim 1, wherein the one or more computer-readable media store computer-executable instructions that cause the one or more processors to perform acts that further comprise tracking movement of the display area; and wherein adjusting the focus of the projector optimizes the focus as the display moves.

17. The method of claim 4, further comprising tracking movement of the display area; and wherein the evaluating the contrast and the focusing the projected content are performed during the movement to optimize the focus on the display area.

* * * * *